(12) United States Patent
Kim et al.

(10) Patent No.: US 11,820,177 B2
(45) Date of Patent: Nov. 21, 2023

(54) TIRE WEAR MEASUREMENT DEVICE USING TIRE BENDING STIFFNESS VARIATION AND TIRE WEAR MEASUREMENT METHOD USING SAME

(71) Applicants: Hankook Tire & Technology Co., Ltd., Seongnam-si (KR); Korea Advanced Institute of Science and Technology, Daejeon (KR)

(72) Inventors: Min Tae Kim, Daejeon (KR); Ho Jong Lee, Daejeon (KR); Sei Bum Choi, Daejeon (KR); Da Sol Jeong, Seoul (KR); Jong Hyup Lee, Uijeongbu-si (KR)

(73) Assignees: Hankook Tire & Technology Co., Ltd., Seongnam-si (KR); Korea Advanced Institute of Science and Technology, Daejeon (KR)

( * ) Notice: Subject to any disclaimer, the term of this patent is extended or adjusted under 35 U.S.C. 154(b) by 492 days.

(21) Appl. No.: 17/061,385

(22) Filed: Oct. 1, 2020

(65) Prior Publication Data

US 2021/0101417 A1 Apr. 8, 2021

(30) Foreign Application Priority Data

Oct. 2, 2019 (KR) .......................... 10-2019-0122358

(51) Int. Cl.
*B60C 11/24* (2006.01)
*B60C 19/00* (2006.01)
(Continued)

(52) U.S. Cl.
CPC ............ *B60C 11/246* (2013.01); *B60C 19/00* (2013.01); *B60Q 9/00* (2013.01); *G01M 17/02* (2013.01);
(Continued)

(58) Field of Classification Search
CPC .................................................. B60C 11/246
See application file for complete search history.

(56) References Cited

U.S. PATENT DOCUMENTS

8,061,191 B2 11/2011 Hanatsuka
8,483,976 B2 7/2013 Morinaga
(Continued)

*Primary Examiner* — Michael A Berns
(74) *Attorney, Agent, or Firm* — Knobbe, Martens, Olson & Bear, LLP (57) ABSTRACT

Provided is a technology of estimating a bending stiffness variation of a tire and estimating a tread wear amount of a tire using the same. A tire wear measuring apparatus wear includes a signal receiver configured to measure acceleration inside the tire with respect to an axial direction, which is a radial direction of the tire, for each point inside the tire, a signal analyzer configured to receive signal information from the signal receiver and estimate a tread wear rate of the tire by calculating a bending stiffness variation rate of the tire using axial acceleration inside the tire, a transmitter configured to receive and transmit analysis information, which is information on the tread wear rate of the tire, from the signal analyzer, and a control module configured to receive the analysis information from the transmitter and generate a control signal for a vehicle to which the tire is installed. Meanwhile, a physical change thereof is derived using a Flexible Ring tire model which is a mathematical model.

6 Claims, 7 Drawing Sheets

(51) Int. Cl.
*B60Q 9/00* (2006.01)
*G01M 17/02* (2006.01)
*G01P 15/00* (2006.01)

(52) U.S. Cl.
CPC ........ *G01P 15/00* (2013.01); *B60C 2019/004* (2013.01)

(56) References Cited

U.S. PATENT DOCUMENTS

| | | | | |
|---|---|---|---|---|
| 9,636,955 | B2* | 5/2017 | Singh | ..................... G01K 13/08 |
| 9,821,611 | B2* | 11/2017 | Singh | ..................... B60C 23/02 |
| 10,603,962 | B2* | 3/2020 | Singh | .................. B60C 23/0408 |
| 2015/0360525 | A1 | 12/2015 | Singh et al. | |
| 2017/0113495 | A1 | 4/2017 | Singh | |
| 2021/0101415 | A1* | 4/2021 | Kim | ..................... B60C 11/243 |
| 2021/0101416 | A1* | 4/2021 | Kim | ..................... G01M 17/02 |
| 2021/0101417 | A1* | 4/2021 | Kim | ..................... G01M 17/02 |

* cited by examiner

TIRE WEAR MEASUREMENT DEVICE USING TIRE BENDING STIFFNESS VARIATION AND TIRE WEAR MEASUREMENT METHOD USING SAME

CROSS-REFERENCE TO RELATED APPLICATION

This application claims priority to Korean Patent Application No. 10-2019-0122358 filed on Oct. 2, 2019, the disclosure of which including the specification, the drawings, and the claims is hereby incorporated by reference in its entirety.

BACKGROUND

Field

The present disclosure generally relates to tires, and more particularly to a tire wear measuring apparatus and a tire wear measuring method using the same.

Description of the Related Art

Among the components of a vehicle, tires are the only components contacting a road surface and are directly related to the vehicle's turning and braking performance. If tires are worn, the turning and braking performance may not be properly implemented. Thus, worn tires may be directly related to the vehicle's safety. Specifically, if a braking distance on a wet road surface increases due to the wear of the tire, it may directly lead to a vehicle accident.

Accordingly, research and development of a system which measures the wear rate of tire tread and the like in real time and automatically informs the replacement time of tires according to the wear rate of tires are being actively conducted.

In U.S. Patent Application Publication No. 2017-0113495 (Title: Indirect tire wear state estimation system), load of a vehicle is inferred and then a wear rate according to a distance travelled is estimated based on the load of the vehicle. However, it is inefficient since information on too many factors is required to estimate the wear rate. In addition, in U.S. Pat. No. 8,483,976 (Title: Method for estimating tire wear and apparatus for estimating tire wear) and U.S. Pat. No. 8,061,191 (Title: Method and apparatus for detecting wear of tire), a wear rate of a tire is measured by a method using sensing of a tire. However, it is difficult to expect consistent results. Further, actual vehicle operating conditions are not considered, resulting in a limitation in determining accurate tire wear under actual conditions.

SUMMARY

The present disclosure generally relates to tires, and more particularly to a tire wear measuring apparatus using a bending stiffness variation of a tire and a tire wear measuring method using the same and, more specifically, to a technology of estimating a bending stiffness variation of a tire and measuring a tread wear amount of a tire using the same one object of one or more aspects of the present disclosure for solving the above problems is to estimate a bending stiffness variation of a tire and measure a tread wear amount of a tire using the same.

The technical objects to be achieved by the present disclosure are not limited to as described-above, and other technical objects which are not described will be clearly understood by a person who has ordinary knowledge in a technical field to which the present disclosure pertains from the following description.

A configuration of the present invention for achieving the above objects includes: a signal receiver configured to measure acceleration inside the tire with respect to an axial direction, which is a radial direction of the tire, for each point inside the tire; a signal analyzer configured to receive signal information from the signal receiver and estimate a tread wear rate of the tire by calculating a bending stiffness variation rate of the tire using axial acceleration inside the tire; a transmitter configured to receive and transmit analysis information, which is information on the tread wear rate of the tire, from the signal analyzer; and a control module configured to receive the analysis information from the transmitter and generate a control signal for a vehicle to which the tire is installed.

In one embodiment of the present disclosure, the signal analyzer may be further configured to calculate a bending stiffness variation rate of the tire using the following equation according to Fourier series analysis, wherein a value on the left-hand side of the following equation is calculated using a value of the acceleration inside the tire:

$$\frac{\int_{-\pi}^{\pi} \ddot{w}(\theta)\cos(n\theta)d\theta}{\pi\Omega^2} = -\frac{Q_w}{R\theta_r \pi p_0} \times \frac{n^3}{An^6 + (-2n+B)n^4 + (A-B+C)n^2 + D} \times \sin(n\theta_r)$$

In another embodiment of the present disclosure, the signal analyzer may derive a dimensionless number A, which is the bending stiffness variation rate of the tire, by repeatedly applying a predetermined variable value into each of the dimensionless numbers A to D.

In yet another embodiment of the present disclosure, the control module may include a vehicle controller configured to control the vehicle and an information transmitter configured to receive the analysis information from the transmitter and transmit the analysis information to the vehicle controller. The vehicle controller may be further configured to determine a replacement time of the tire using the analysis information.

In further embodiment of the present disclosure, the control module may further include a display configured to display the replacement time of the tire or information on a service of replacing the tire.

A configuration of the present invention for achieving the above objects includes: a first step of measuring acceleration inside a tire with respect to an axial direction for each point inside the tire; a second step of estimating a tread wear rate of the tire by calculating a bending stiffness variation rate of the tire using axial acceleration inside the tire; a third step of determining a replacement time of the tire using information on the tread wear rate of the tire; and a fourth step of transmitting information on the replacement time of the tire to a user of the vehicle and an external integrated control system connected to the vehicle.

BRIEF DESCRIPTION OF THE DRAWINGS

Hereinafter, the present disclosure will be described with reference to the accompanying drawings. However, the present disclosure can be implemented in various different forms and is not limited to the embodiments described herein. To clearly describe the present disclosure, parts irrelevant to the description will be omitted in the drawings, and like elements will be designated by like numerals throughout the specification.

DETAILED DESCRIPTION

In this specification, when a part is referred to as being "connected" to another part, it may not only be "directly connected" but also may be "electrically connected" to the other part via an element disposed therebetween. Also, when a part is referred to as "including" an element, this means that the part does not exclude another element and may further include another element unless stated otherwise.

The terminology used herein is merely for the purpose of describing particular embodiments and is not intended to limit the invention. A singular form is intended to include a plural form as well, unless the context clearly indicates otherwise. It will be further understood that the terms "comprises" and/or "comprising," when used in this specification, specify the presence of stated features, integers, steps, operations, elements, components, and/or combinations thereof but do not preclude the presence or addition of one or more other features, integers, steps, operations, elements, components, and/or combinations thereof.

Hereinafter, the present disclosure will be described in detail with reference to the accompanying drawings.

Figure 1:
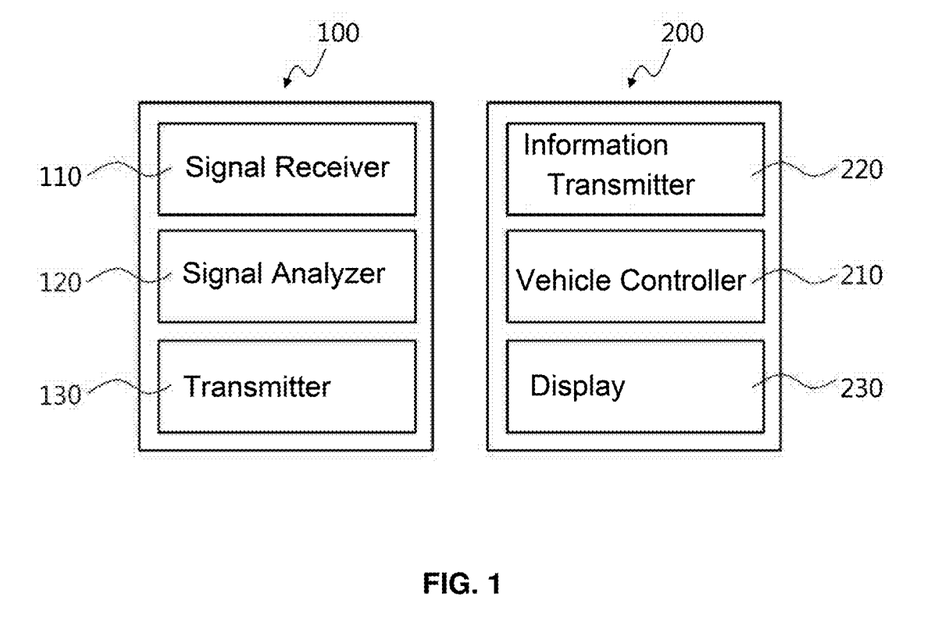
FIG. 1 is a schematic diagram of a configuration of a tire wear measuring apparatus according to an embodiment of the present disclosure.

FIG. 1 is a schematic diagram of a configuration of an apparatus for measuring wear of a tire 10 according to an embodiment of the present disclosure. As shown in FIG. 1, the apparatus for measuring wear of the tire 10 includes: a signal receiver 110 configured to measure acceleration inside the tire 10 with respect to an axial direction, which is a radial direction of the tire 10, for each point inside the tire 10; a signal analyzer 120 configured to receive signal information from the signal receiver 110 and estimate a tread wear rate of the tire 10 by calculating a bending stiffness variation rate of the tire 10 using axial acceleration inside the tire 10; a transmitter 130 configured to receive and transmit analysis information, which is information on the tread wear rate of the tire 10, from the signal analyzer 120; and a control module 200 configured to receive analysis information from the transmitter 130 and generate a control signal for a vehicle to which the tire 10 is installed.

Here, a measurement module 100 may be formed by combining the signal receiver 110, the signal analyzer 120, and the transmitter 130, and the measurement module 100 may be formed by being connected to each tire 10 installed to the vehicle or may be formed by being connected to every tire 10 installed to the vehicle.

In addition, the control module 200 includes a vehicle controller 210 for controlling a vehicle and an information transmitter 220 for receiving analysis information from the transmitter 130 and transmitting the received analysis information to the vehicle controller 210, and the vehicle controller 210 may determine replacement time of the tire 10 using the analysis information. In addition, the control module 200 may further include a display 230 for displaying a replacement time of the tire 10 or information on a service of replacing the tire 10.

The signal receiver 110 may include a plurality of acceleration sensors, and each of the plurality of acceleration sensors may measure acceleration in an axial direction of each of a plurality of points inside a tread of the tire 10. Further, a number may be sequentially assigned to each acceleration sensor, and accordingly, measurement signals measured by the respective acceleration sensors may be sequentially collected and converted into data. In addition, in response to receiving analysis information, the transmitter 130 may transmit the analysis information to the information transmitter 220 of the control module 200 wirelessly or by wire. To this end, the information transmitter 220 may be connected to the transmitter 130 wirelessly or by wire.

The vehicle controller 210 may be wirelessly connected to an integrated control system outside the vehicle while controlling the vehicle. In the vehicle controller 210, replacement time information, which is information on a scheduled replacement time of the tire 10 according to a wear rate of the tire 10, may be stored in advance, and the vehicle controller 210 may compare the replacement time information with the wear rate of the tire 10 in real time to determine information on a remaining time for replacement of the tire 10, the replacement time of the tire 10, and the like. In addition, the vehicle controller 210 may transmit the information on the remaining time for replacement of the tire 10, the replacement time of the tire 10, and the like to the integrated control system. Using the information transmitted from the vehicle controller 210, the integrated control system may transmit, to the vehicle controller 210, information on a replacement service of the tire 10 such as a quantity of tires 10 stocked at a replacement time of the tire 10 installed to the vehicle, a repair center available for replacement of the tire 10, and the like. The vehicle controller 210 may transmit the information on the replacement service of the tire 10 to the display 230, and such information may be displayed on the display 230. In addition, even the information on the remaining time for replacement of the tire 10 and the replacement time of the tire 10, which is generated by the vehicle controller 210, may also be displayed on the display 230 and informed to a user.

Hereinafter, without being bound to any theory, a process of deriving an equation for estimating a wear rate of the tire 10 by the signal analyzer 120 will be described.

As the wear of the tire 10 progresses, a value that changes the most can be a tread thickness h of the tire 10. That is, the wear of the tread of the tire 10 causes a mass loss of the tread of the tire 10, and thus, the thickness of the tread of the tire 10 may be reduced. In addition, as shown in Equation 1 below, the thickness of the tread of the tire 10 is directly related to bending stiffness of the tire 10, and, specifically, the bending stiffness may be proportional to the cube of the thickness of the tread of the tire 10.

$$\text{Bending sriffness; } EI = E\frac{bh^3}{12} \propto h^3 \quad \text{[EQUATION 1]}$$

Here, E is an elastic modulus, I is a moment of inertia for a cross section of the tire 10 perpendicular to the axial direction, and h is a thickness of the tread of the tire 10 as described above.

The thickness h of the tire 10 may be analyzed through a Flexible Ring tire model for analysis of a model parameter $A'_n$ of the tire 10, and the analyzed equation may be expressed as follows. In this case, the analysis of the Flexible Ring tire model may be performed using a computer program. The computer program used for this analysis may calculate an equation using, e.g., Python or Matlab, and the analysis of the Flexible Ring tire model may be performed through a simulation using such a computer program. In addition, the tendency of a mathematical model may be verified using a FEM program such as ANSYS, NASTRAN, and ABAQUS, to name a few. In addition, an equation gone through the analysis of the Flexible Ring tire model may be expressed as Equation 2 as below.

$$\omega(\theta) = \sum_{n=0}^{\infty} A'_n [\alpha_n \cos n(\theta - \gamma_n) + \beta_n \sin n(\theta - \gamma_n)] \quad \text{[EQUATION 2]}$$

Here, n is a mode number, which is a number of the aforementioned acceleration sensor, $\theta$ is a central angle of an acceleration sensing point inside the tire 10 in response to rotation, and $w(\theta)$ is a value obtained by applying $\theta$ in an axial direction transformation equation of the tire 10, that is, an axial direction transformation value of the tire 10 according to $\theta$. Hereinafter, in the following, each coefficient and each character may be used as the same.

In Equation 2, a model parameter $A'_n$ of the tire 10 may be calculated by Equation 3 and Equation 3-1 to Equation 3-4 as below.

$$A'_n = -\frac{n^2}{\pi} \frac{1}{\sqrt{[k_n - m_n(n\Omega)^2 - g_n(n\Omega)]^2 + [c_n(n\Omega)]^2}} \quad \text{[EQUATION 3]}$$

$$m_n = \rho A(1 + n^2) \quad \text{[EQUATION 3-1]}$$

$$g_n = -4\rho An\Omega \quad \text{[EQUATION 3-2]}$$

$$c_n = c_v + c_\omega n^2 \quad \text{[EQUATION 3-3]}$$

$$k_n = \left(\frac{EI}{R^4}n^2 + \frac{\sigma_{\theta\theta}^0}{R^2}\right)(1 - n^2)^2 - \frac{p_0 b}{R}(1 - n^2) + \quad \text{[EQUATION 3-4]}$$
$$k_v + k_\omega n^2 - \rho A(1 + n^2)\Omega^2$$
$$= \frac{EI}{R^4}n^6 + \left(-2\frac{EI}{R^4} + \frac{p_0 b}{R} + \rho A\Omega^2\right)n^4 +$$
$$\left(\frac{EI}{R^4} - \frac{p_0 b}{R} - 3\rho A\Omega^2 + k_\omega\right)n^2 + k_v$$

In Equation 3 and Equation 3-1 to Equation 3-4, n is a mode number, which is a number of the aforementioned acceleration sensor(s), $\Omega$ is an average angular speed of the tire 10, A is a cross-sectional area of the tread of the tire 10 perpendicular to the axial direction, p is a density of the tire 10, $c_v$ is a rolling resistance coefficient for the axial direction of the tire 10, and $c_w$ is a rolling resistance coefficient for a tangential direction of an outer circumference of the tire 10.

In addition, R is a radius of the tire 10, $\sigma_\theta^0$ is initial stress, $p^0$ is pressure of the tire 10, b is a width of the tread of the tire 10, $k_v$ is a stiffness coefficient for the axial direction of the tire 10, and $k_w$ is a stiffness coefficient for the tangential direction of the outer circumference of the tire 10. Hereinafter, in the following, each coefficient and each character may be used as the same.

Input values $\alpha_n$ and $\beta_n$ for respective modes may be calculated by Equation 4-1 and Equation 4-2 as below.

$$\alpha_n = \int_{\theta_f}^{\theta_r} q_w(\phi) \cdot \cos(n\theta) d\theta \quad \text{[EQUATION 4-1]}$$

$$\beta_n = \int_{\theta_f}^{\theta_r} q_w(\theta) \cdot \sin(n\theta) d\theta \quad \text{[EQUATION 4-2]}$$

In Equation 4-1 and Equation 4-2, $q_w$ is an external force applied in the axial direction of the tire 10, that is, a load between a road surface 1 and a contact surface of the tire 10, n is a mode number which is a number of the aforementioned acceleration sensor, $\theta(\Phi)$ is a central angle of an acceleration sensing point inside the tire 10 in response to rotation, $\theta_f$ is a start position angle of $\theta$ with respect to an arbitrary reference radius in the tire 10, and $\theta_r$ is an ending position angle of $\theta$ with respect to the arbitrary reference radius in the tire 10. Hereinafter, in the following, each coefficient and each character may be used as the same.

Figure 2:
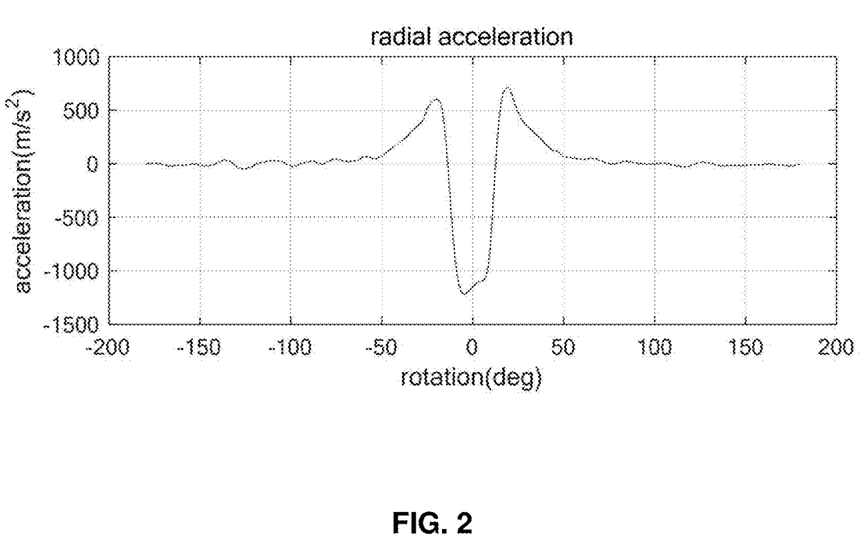
FIG. 2 is a graph showing values measured by an acceleration sensor according to an embodiment of the present disclosure.

FIG. 2 is a graph showing acceleration values measured by an acceleration sensor according to an embodiment of the present disclosure. In FIG. 2, a vertical axis represents acceleration in the axial direction, and a horizontal axis represents rotation (deg) of the tire 10. If the left and right internal signals of the tire 10 are almost symmetrical during a straight travel, it may be assumed that there is no internal attenuation of the tire 10, and, as shown in FIG. 2, a difference between the left and right may be simplified and applied to a model. With this assumption, a model parameter $A'_n$ of the tire 10, which is an equation for a model of the tire 10, may be summarized as Equation 5 below. Here, since there is no internal attenuation of the tire 10, the rolling resistance value $c_n$ may be 0.

$$An' = -\frac{n^2}{\pi} \frac{R^4}{EIn^6 + (-2EI + bR^3 p_0)n^4 + (EI - bR^3 p_0 + k_\omega R^4)n^2 + k_v R^4} \quad \text{[EQUATION 5]}$$

Here, each coefficient and each character represent the same as those used in the above equations.

For the simple model of the tire 10 according to Equation 5, dimensional analysis may be performed through Buckingham PI theorem. The dimensional analysis through Buckingham PI theorem may be expressed as Equation 6.

$$T(An' p_0) = f\left(A\left(\frac{EI}{R^4 p_0}\right), B\left(\frac{b}{R}\right), C\left(\frac{k_w}{p_0}\right), D\left(\frac{k_v}{p_0}\right)\right) \quad \text{[EQUATION 6]}$$

Here, each coefficient and each character represent the same as those used in the above equations.

That is, the relationship may be confirmed through such dimensional analysis, and a total of 4 dimensionless numbers A to D according to Equation 7-1 to Equation 7-4 below may be derived through simplification of the model of the tire 10 and the dimensional analysis.

$$A\left(=\frac{EI}{R^4 p_0}=\frac{bEh^3}{12R^4 p_0}\right) \quad \text{[EQUATION 7-1]}$$

$$B\left(=\frac{b}{R}\right) \quad \text{[EQUATION 7-2]}$$

$$C\left(=\frac{k_\omega}{p_0}\right) \quad \text{[EQUATION 7-3]}$$

$$D\left(=\frac{k_\omega}{p_0}\right) \quad \text{[EQUATION 7-4]}$$

In Equation 7-1 to Equation 7-4, each coefficient and each character represent the same as those used in the above equations.

The dimensionless number A is a value obtained by dividing the bending stiffness value (EI) by the fourth power value ($R^4$) of the radius (R) of the tire 10 and the air pressure value ($p_0$) of the tire 10. This should be reflected in the paragraphs, and may be a measure of how well the tire 10 bends. The dimensionless number B is a value obtained by dividing a contact width between the tire 10 and the road surface 1 by the radius of the tire 10, and may be a measure of how widely the tire 10 contacts the ground. The dimensionless number C is a ratio of a radial strength (stiffness coefficient) of the tread of the tire 10 to pressure of the tire 10, and the dimensionless number D may be a longitudinal strength (stiffness coefficient) of the tread of the tire 10 to pressure of the tire 10.

The aforementioned dimensionless number A is a factor proportional to the cube of h (the thickness of the tread of the tire 10) and thus it may be referred as a bending stiffness number. In addition, when using the dimensionless number A, a decrease in the bending stiffness number may be expected as h (the thickness of the tread of the tire 10) decreases. If an input is simplified to derive a wear estimating factor using a bending stiffness number, it may be expressed as Equation 8-1 below.

$$\text{Input:} \alpha_n \cos n(\theta-\gamma_n)+\beta_n \sin n(\theta-\gamma_n) \quad \text{[EQUATION 8-1]}$$

In addition, each variable in Equation 8-1 may be calculated by Equation 8-2 to Equation 8-4.

$$\gamma_n = \tan^{-1}\left(\frac{cn(n\Omega)}{k_n - m_n(n\Omega)^2 - g_n(n\Omega)}\right) \quad \text{[EQUATION 8-2]}$$

$$\alpha_n = \int_{\theta_f}^{\theta_r} q_\omega(\theta) \cdot \cos(n\theta) d\theta \quad \text{[EQUATION 8-3]}$$

$$\beta_n = \int_{\theta_f}^{\theta_r} q_\omega(\theta) \cdot \sin(n\theta) d\theta \quad \text{[EQUATION 8-4]}$$

Here, as previously assumed, if the assumption that the internal attenuation of the tire 10 is 0 is applied, it may be expressed as Equation 8-5.

$$n\gamma_n = \tan^{-1}\left(\frac{c_n(n\Omega)}{k_n - m_n(n\Omega)^2 - a_n(n\Omega)}\right) = 0 \quad \text{[EQUATION 8-5]}$$

In Equation 8-1 to Equation 8-5, each coefficient and each characteristic represent the same as those used in the above-described equations.

Figure 3:
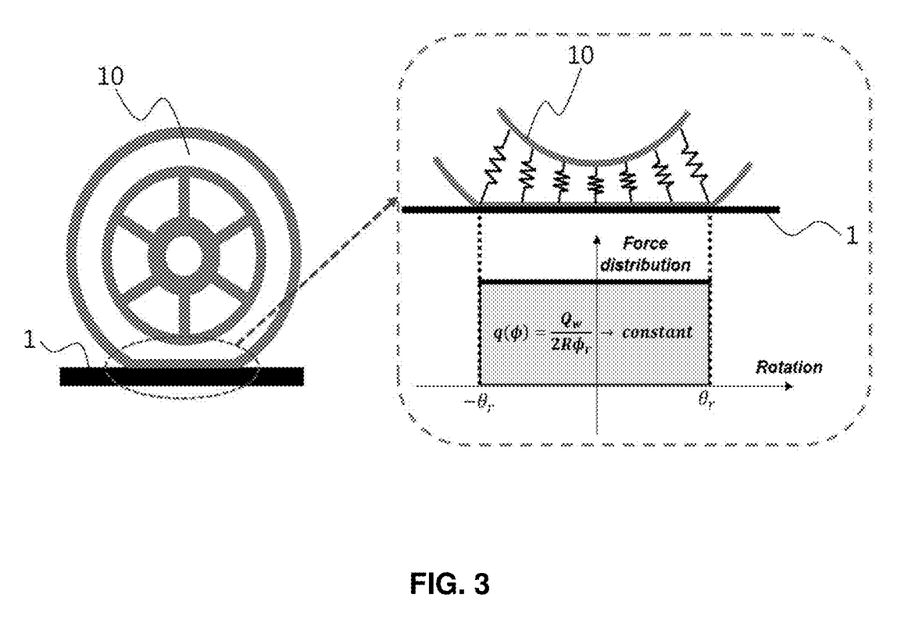
FIG. 3 is a schematic diagram illustrating a distribution of force received by a tire from a road surface according to an embodiment of the present disclosure.

FIG. 3 is a schematic diagram showing a distribution of the force received from the road surface 1 by the tire 10, as used in calculations according to an embodiment of the present disclosure. As shown in FIG. 3, an input applied based on two assumptions that there is no attenuation of force received from the road surface 1 by the tire 10 and that contact pressure is equal at any point may be simplified as shown in Equation 9-1.

$$\text{Input:} \alpha_n \cos n\theta, \text{ (where } \alpha_n = \int_{\theta_f}^{\theta_r} q_w(\theta) \cdot \cos(n\theta) d\theta\text{)} \quad \text{[EQUATION 9-1]}$$

A sum of forces received by the tire 10 from the road surface 1 is the same as a total load of the tire 10, and a boundary condition may be set such that a force received from the road surface 1 at both contact ends of the tire 10 is 0. In doing so, a magnitude of the force received by the tire 10 from the road surface 1 may be expressed as Equation 9-2 and Equation 9-3. Here, Equation 9-2 may be an equation for a state in which the tire 10 is being grounded, and Equation 9-3 may be an equation for a state in which the tire 10 is being released.

$$R\int_{\theta_f}^{\theta_r} q_w(\theta) d\theta = Q_w \quad \text{[EQUATION 9-2]}$$

Here, $Q_w$ is the total load of the tire 10.

$$q_w(\theta_f) = q_w(\theta_r) = 0 \quad \text{[EQUATION 9-3]}$$

The force received by the tire 10 to the road surface 1 under the above conditions may be derived by Equation 9-4 and Equation 9-5. Here, an input may be determined by Equation 9-5.

$$q_\omega(\theta) = \frac{Q_\omega}{2R\theta_r} \quad \text{[EQUATION 9-4]}$$

$$\text{Input: } \alpha_n \cos(n\theta) = \quad \text{[EQUATION 9-5]}$$
$$\int_{\theta_f}^{\theta_r} q(\theta)\cos(n\theta) d\theta = \frac{Q_\omega}{nR\theta_r}\sin(n\theta_r) \cdot \cos n\theta$$

In Equation 9-1 to Equation 9-5, $q(\theta)$ is a pressure at a contact point between the tire 10 and the road surface 1 when a central angle of an acceleration sensing point inside the tire 10 with respect to rotation is $\theta$. In addition, each coefficient and each character may represent the same as those used in the above equations.

If an axial direction transformation equation is summarized using Equation 9-5, it may be expressed as Equation 10-1.

$$\omega(\theta) = \sum_{n=0}^{\infty} A'_n \alpha_n \cos(n\theta) \quad \text{[EQUATION 10-1]}$$

And, a model parameter $A'_n$ of the tire 10 applied to Equation 10-1 may be calculated by Equation 10-2, and an input may be calculated by Equation 10-3.

$$A'_n = -\frac{n^2}{\pi p_0} \frac{1}{An^6 + (-2A+B)n^4 + (A-B+C)n^2 + D} \quad \text{[EQUATION 10-2]}$$

$$\text{Input: } \alpha_n \cos(n\theta) = \frac{Q_\omega}{nR\phi_r}\sin(n\theta_r)\cos(n\theta) \quad \text{[EQUATION 10-3]}$$

If Equation 10-1 is differentiated twice, it may be calculated as in Equation 10-4.

$$\ddot{\omega}(\theta) = -\Omega^2 \sum_{n=0}^{\infty} n^2 \times A'_n \alpha_n \cos(n\theta) \quad \text{[EQUATION 10-4]}$$

In Equation 10-1 to Equation 10-4, each coefficient and each character represent the same as those used in the above-described equations.

According to Equation 10-4, it may be found that axial acceleration inside the tire 10 has only a cosine component, and this equation may be expressed as Fourier series, and when the equation is summarized by reflecting such matters, it may be expressed as Equation 11-1.

$$\int_{-\pi}^{\pi} \ddot{\omega}(\theta)\frac{1}{\Omega^2}\cos(n\theta)d\theta = -n^2 \times \pi \times A'_n \alpha_n \qquad [\text{EQUATION 11-1}]$$

When Equation 10-2 regarding a model parameter $A'_n$ of tire 10 conclusively summarized and Equation 10-3 regarding an input are applied in Equation 11-1, Equation 11-2 as below may be derived.

$$\frac{\int_{-\pi}^{\pi} \ddot{\omega}(\theta)\cos(n\theta)d\theta}{\pi\Omega^2} = -\frac{Q_\omega}{R\theta_r \pi p_0} \times \frac{n^3}{An^6 + (-2A+B)n^4 + (A-B+C)n^2 + D} \times \sin(n\theta_r) \qquad [\text{EQUATION 11-2}]$$

In conclusion, the signal analyzer 120 may calculate a bending stiffness variation rate of the tire 10 using Equation 11-2 according to Fourier series analysis, and the value on the left-hand side of Equation 11-2 may be calculated using a value of the acceleration inside the tire 10. In Equation 11-1 and Equation 11-2, each coefficient and each character represent the same as those used in the above equations.

In addition, the signal analyzer 120 may derive the dimensionless number A, which is a bending stiffness variation rate of the tire 10, by repeatedly applying a predetermined variable value into each of the dimensionless numbers A to D. A description thereof may be described using graphs of each of the following drawings.

Figure 4:
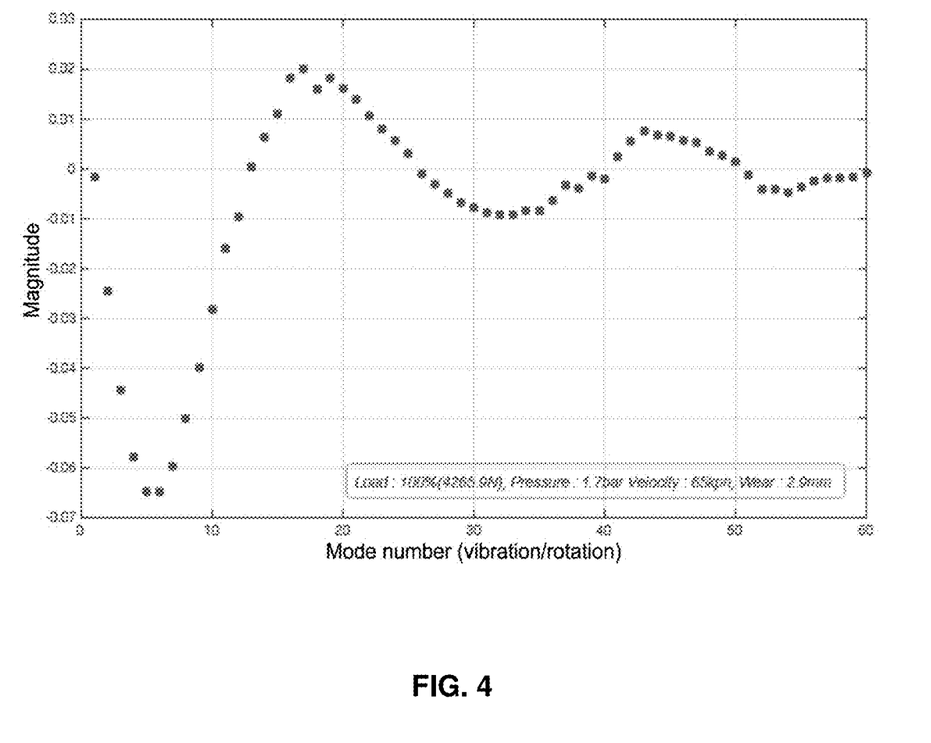
FIG. 4 is a graph showing Fourier series analysis through an axial acceleration of a tire, which is obtained through an acceleration sensor, according to an embodiment of the present disclosure.
Figure 5:
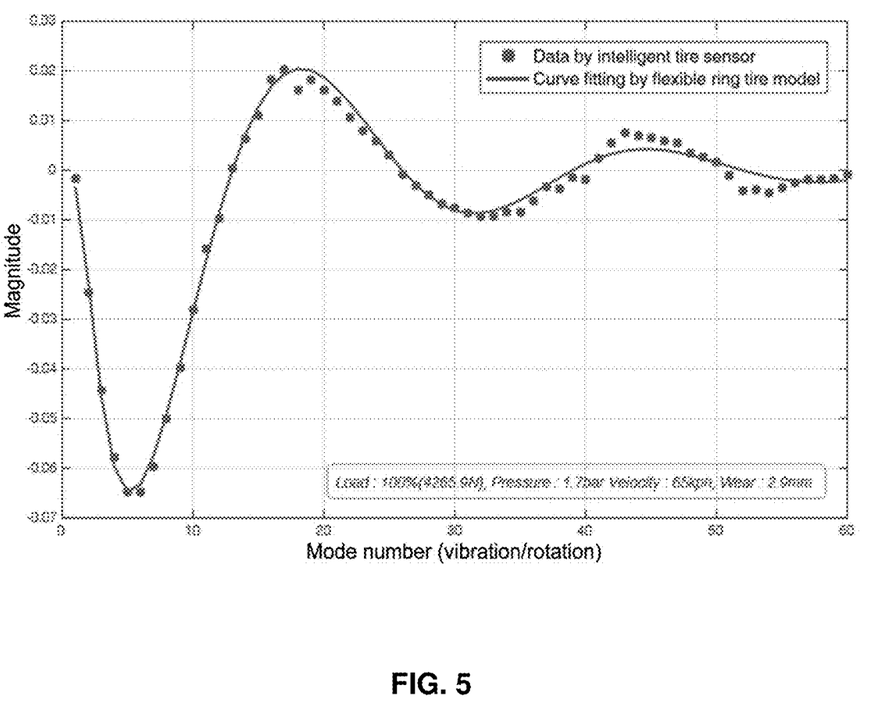
FIG. 5 is a graph showing a result of curve fitting based on Fourier series analysis through an axial acceleration of a tire, which is obtained through an acceleration sensor, according to an embodiment of the present disclosure.

FIG. 4 is a graph showing a Fourier series analysis through an axial acceleration of the tire 10, which is obtained through an acceleration sensor, according to an embodiment of the present disclosure, and FIG. 5 is a graph showing a result of curve fitting based on Fourier series analysis through a axial acceleration of the tire 10, which is obtained through an acceleration sensor, according to an embodiment of the present disclosure. In FIGS. 4 and 5, a vertical axis may represent a Fourier series range, and a horizontal axis may represent a mode number.

As shown in Equation 11-2 and FIG. 4, it is found that the cosine component of the axial acceleration of the tire 10 has a sine wave form with respect to n. In addition, FIG. 5 shows the magnitude of each mode number of true axial acceleration of the tire 10, and in this case, X-axis may represent the number of stationary wave modes and Y-axis may represent the left-hand side of an equation calculated through an acceleration sensor signal of the tire 10.

As a result of the analysis, like a result of the Flexible Ring model, it is found that a true axial acceleration inside the tire 10 takes a sine wave form, and this is verified through a signal from a axial acceleration sensor.

As described above, for the left-hand side of Equation 11-2, $\int_{-\pi}^{\pi}\ddot{w}(\theta)\cos(n\theta)d\theta$ indicates acceleration and thus may be calculated by dividing an acceleration value obtained by the acceleration sensor by a value $\pi\Omega^2$ which is already known. In addition, for the right-hand side of Equation 11-2, the dimensionless numbers A to D are changed and fitted to a value of the left-hand side of Equation 11-1 using an acceleration value actually measured by the acceleration sensor, thereby deriving values of A to D, and such a result of fitting may be found in FIG. 5. In FIG. 5, the solid line represents a distribution of Fourier series analysis data using the Flexible Ring tire model, and the dotted line represents a distribution of Fourier series analysis data when an acceleration value actually measured using the acceleration sensor is applied to Equation 11-2. As shown in FIG. 5, it may be found that a similar data distribution is formed as a result of curve fitting using both data based on the Fourier series.

Figure 6:
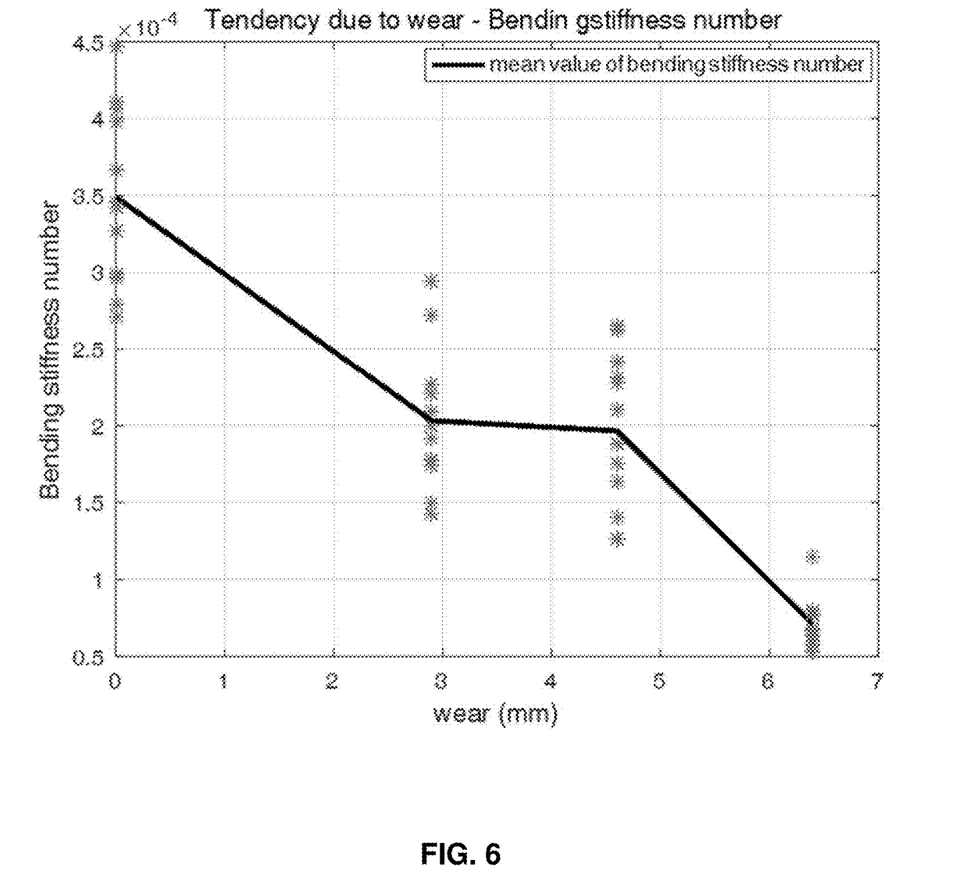
FIG. 6 is a graph showing the tendency of a bending stiffness number according to a wear amount of a tire tread according to an embodiment of the present disclosure.
Figure 7:
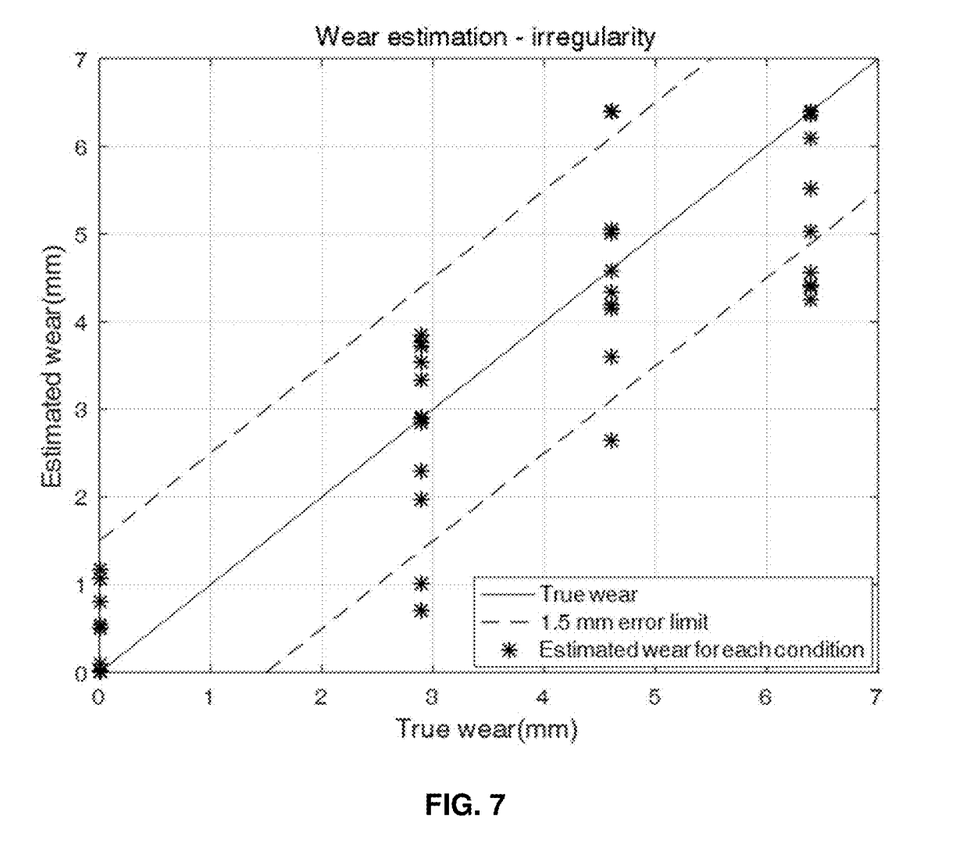
FIG. 7 is a graph showing a comparison between the tendency of a bending stiffness number and a true wear amount of a tire according to an embodiment of the present disclosure.

FIG. 6 is a graph showing the tendency of a bending stiffness number according to wear of the tread of the tire 10 according to an embodiment of the present disclosure, and FIG. 7 is a graph comparing the tendency of a bending stiffness number according to an embodiment of the present disclosure and a true wear amount of the tire 10. In FIG. 6, the vertical axis may represent a bending stiffness number, and the horizontal axis may represent a true wear amount (mm) of the tread of the tire 10. In addition, in FIG. 7, the vertical axis may represent a wear amount (mm) calculated using the Flexible Ring tire model, and the horizontal axis may represent a true wear amount (mm) of the tread of the tire 10.

As shown in FIGS. 6 and 7 regarding the tendency of the bending stiffness number, the bending stiffness number was estimated based on acceleration inside the tire 10, which is measured for various conditions while changing the pressure, load, speed, and the like of the tire 10, and a result thereof is the same as shown in FIGS. 6 and 7. Here, each point indicates results of various conditions.

As a result of analyzing the bending stiffness number, as expected, it is found that the bending stiffness number tends to decrease as the wear amount of the tire 10 increases. As described above, it may be analyzed that the value of h (the thickness of the tread of the tire 10) decreases as the wear of the tread of the tire 10 progresses, and accordingly, the bending stiffness number in proportion to $h^3$ also decreases. That is, it may be seen that the bending stiffness number, which tends to steadily decrease as the wear of the tread of the tire 10 increases, may be used as a wear estimating factor.

Hereinafter, a tire wear measuring method of a tire wear measuring apparatus according to the present disclosure will be described.

In a first step, acceleration inside the tire 10 with respect to the axial direction may be measured for each point inside the tire 10. Next, in a second step, a bending stiffness variation rate of the tire 10 is calculated using the axial acceleration inside the tire 10, so that a tread wear rate of the tire 10 can be estimated. Next, in a third step, a replacement time of the tire 10 may be determined using information on the tread wear rate of the tire 10. Then, in a fourth step, information on the replacement time of the tire 10 may be transmitted to a user of a vehicle and an external integrated control system connected to the vehicle.

Other description about the tire wear measuring method using the tire wear measuring apparatus according to the present disclosure may be the same as the above description about the tire wear measuring apparatus according to the present disclosure.

The present disclosure according to the configuration as described above has an effect that it is possible to measure a true wear amount of a tire in real time since a bending stiffness variation rate of the tire is calculated using an acceleration sensor and then a tread wear amount of the tire is estimated using the calculated bending stiffness variation change of the tire.

In addition, the present disclosure has advantageous effects that information on the wear amount of the tire is shared not only with the user of the vehicle but also with the integrated control system, thereby implementing an automatic service for replacement of the tire.

The effects of the present disclosure are not limited to the above-mentioned effects, and it should be understood that the effects of the present disclosure include all effects that can be inferred from the configuration of the invention described in the detailed description of the invention or the appended claims.

The above description of the example embodiments is provided for the purpose of illustration, and it would be understood by those skilled in the art that various changes and modifications may be made without changing the technical conception and essential features of the embodiments. Thus, it is clear that the above-described embodiments are illustrative in all aspects and do not limit the present disclosure. It will be appreciated that each of the processes, methods, and algorithms such as modules, analyzers and controllers described herein and/or depicted in the figures may be embodied in, and fully or partially automated by, code modules executed by one or more physical computing systems, hardware computer processors, application-specific circuitry, and/or electronic hardware configured to execute specific and particular computer instructions. For example, computing systems may include general purpose computers (e.g., servers) programmed with specific computer instructions or special purpose computers, special purpose circuitry, and so forth. In some embodiments, particular operations and methods may be performed by circuitry that is specific to a given function.

The scope of the inventive concept is defined by the following claims, and it shall be understood that all modifications and embodiments conceived from the meaning and scope of the claims and their equivalents are included in the scope of the present disclosure.

What is claimed is:

1. An apparatus for measuring tire wear using a bending stiffness variation of a tire, the apparatus comprising:
    a signal receiver configured to measure an acceleration inside the tire with respect to a radial direction of the tire, at a plurality of points inside the tire;
    a signal analyzer configured to receive signal information from the signal receiver and estimate a tread wear rate of the tire by calculating a bending stiffness variation rate of the tire using the acceleration measured inside the tire;
    a transmitter configured to receive and transmit analysis information comprising information on the tread wear rate of the tire, from the signal analyzer; and
    a control module configured to receive the analysis information from the transmitter and generate a control signal for a vehicle on which the tire is installed.

2. The apparatus of claim 1, wherein the signal analyzer is further configured to calculate the bending stiffness variation rate of the tire using the following equation according to a Fourier series analysis, wherein a value on a left-hand side of the following equation is calculated using a value of the acceleration inside the tire:

$$\int_{-\pi}^{\pi} \frac{\ddot{w}(\theta)\cos(n\theta)d\theta}{\pi\Omega^2} = -\frac{Q_\pi}{R\theta_r \pi p_0} \times \frac{n^3}{An^6 + (-2A+B)n^4 + (A-B+C)n^2 + D} \times \sin(n\theta_r)$$

where n is a natural number greater than or equal to 1 corresponding to the plurality of points at which the acceleration is measured inside the tire, θ is a central angle of one point in the tire in response to rotation, $\ddot{\omega}(\theta)$ is a value obtained by applying θ in an equation derived by differentiating an axial transformation of the tire twice, and A to D are variable dimensionless numbers.

3. The apparatus of claim 2, wherein the signal analyzer is further configured to periodically derive the dimensionless numbers A to D by repeatedly applying a predetermined variable in each of the dimensionless numbers A to D.

4. The apparatus of claim 1, wherein the control module comprises:
    a vehicle controller configured to control the vehicle; and
    an information transmitter configured to receive the analysis information from the transmitter and transmit the analysis information to the vehicle controller,
    wherein the vehicle controller is further configured to determine a replacement time of the tire using the analysis information.

5. The apparatus of claim 4, wherein the control module further comprises a display configured to display information on a replacement time of the tire or a replacement service of the tire.

6. A method of measuring tire wear using the apparatus of claim 1, the method comprising:
    measuring the acceleration inside the tire with respect to the axial direction at the plurality of points inside the tire;
    estimating the tread wear rate of the tire by calculating the bending stiffness variation rate of the tire using the acceleration measured inside the tire;
    determining a replacement time of the tire using the information on the tread wear rate of the tire; and
    transmitting information on the replacement time of the tire to a user of the vehicle and an external integrated control system connected to the vehicle.

* * * * *

UNITED STATES PATENT AND TRADEMARK OFFICE
CERTIFICATE OF CORRECTION

PATENT NO. : 11,820,177 B2
APPLICATION NO. : 17/061385
DATED : November 21, 2023
INVENTOR(S) : Min Tae Kim It is certified that error appears in the above-identified patent and that said Letters Patent is hereby corrected as shown below:

In the Drawings

Sheet 6 of 7, (x-axis) (FIG. 6), Line 1, delete "Bendin gstiffness" and insert -- Bending stiffness --.

In the Specification

Column 2, Line 28 (approx.), delete "(-2n" and insert -- (-2A --.

Column 5, Line 5 (approx.), delete "sriffness;" and insert -- stiffness; --.

Column 6, Line 24, delete "Of" and insert -- $\theta_f$ --.

Signed and Sealed this
Twelfth Day of November, 2024

Katherine Kelly Vidal
*Director of the United States Patent and Trademark Office*